May 7, 1963 H. E. MARTIN 3,088,687

ENDLESS LOOP TAPE MAGAZINE

Filed Aug. 25, 1959 2 Sheets-Sheet 1

INVENTOR.
HAROLD E. MARTIN
BY George A. Sullivan
Agent

ENDLESS LOOP TAPE MAGAZINE

Filed Aug. 25, 1959 2 Sheets-Sheet 2

INVENTOR.
HAROLD E. MARTIN
BY George C. Sullivan
Agent

United States Patent Office 3,088,687

Patented May 7, 1963

3,088,687
ENDLESS LOOP TAPE MAGAZINE

Harold Edward Martin, San Jose, Calif., assignor to Lockheed Aircraft Corporation, Burbank, Calif.
Filed Aug. 25, 1959, Ser. No. 835,957
15 Claims. (Cl. 242—55.19)

Figure 1:
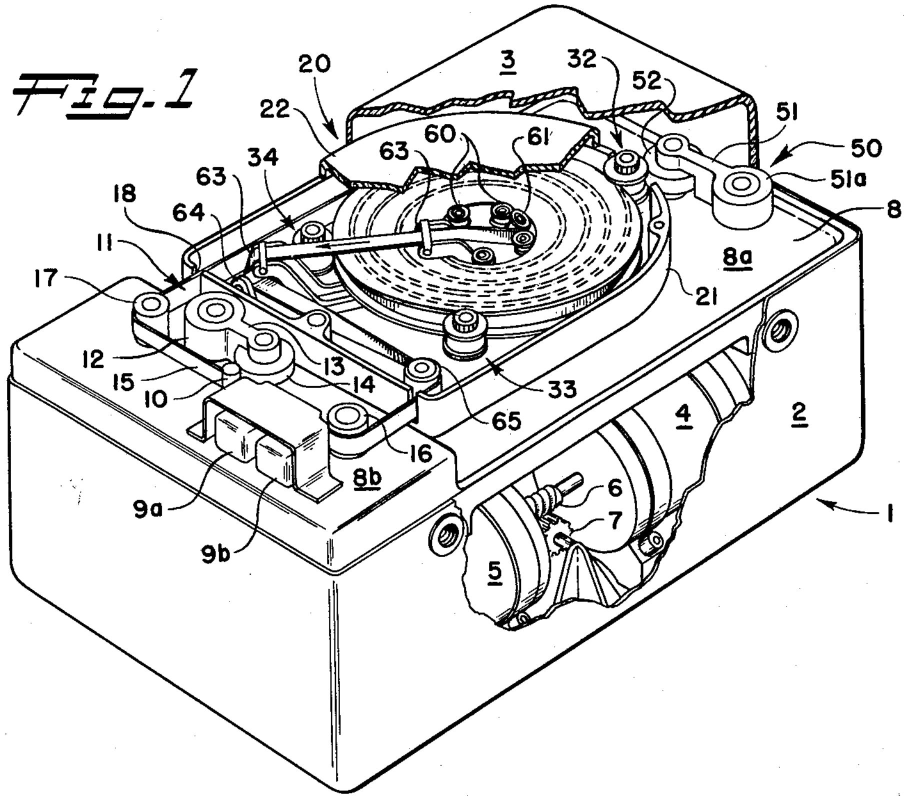

This invention relates generally to tape or film reservoirs and is more specifically directed to a tape magazine or cartridge which is adapted for use in connection with "endless" or continuous tape, films, and the like.

Tape magazines for the storage of "endless" or continuous loops of tape and film have been suggested in the prior art, and the use of such devices has generally become well known as these units have been employed to provide automatic telephone answering and announcing services, advertisements, and the like. Similarly, endless loop tape magazines have been developed for use in moving picture projectors, developing equipment, and storage devices.

Recent advancements in many technical areas, particularly the missile and satellite fields, have created requirements for endless tape, film, ribbon, or flexible strip reservoirs, hereinafter called "tape magazines," that have not been satisfied by existing devices.

For example, especially in the satellite field, the environmental conditions under which such a device must operate are extremely severe by ordinary standards. Low weight becomes of prime importance as well as the ability to operate dependably in extremes of heat and cold which render presently available units inoperative. Additionally, the effectiveness of any mechanical device is severely tested by the high vibration and "G" loads encountered in launching astronautic vehicles. It has recently been observed that an irregular "tumbling" occurs in many satellites, and thus a recording device placed therewithin must inherently be able to operate in the action of rotation through 360° on any axis.

Another important requirement of an airborne tape feeding-storage device is the ability to operate effectively in weightless environment and to stop and start the feeding of tape almost instantaneously.

In order to meet the demanding environmental requirements as set forth above, I have invented a tape magazine which has for its primary object the ability to function effectively in a "tumbling" or multi-rotational environment, as noted, while continuously, controllably feeding and rewinding a closed or endless length of tape material.

Another object of my invention is to provide an endless loop tape magazine in which the speed of reaction to a command to "play," "erase," or "record" is limited essentially only by the inertia of a section of the tape itself and is not burdened by overcoming friction or bringing to a functional speed an entire magazine supply of tape and its accompanying support structure.

Another object of my invention is to provide a tape magazine which eliminates the problems caused by differences in radial speed of the inner and outer circumferences of a spiraled quantity of tape which has heretofore caused considerable difficulty in tape-feeding mechanisms.

An additional object of this invention is to provide a smooth acting continuous feed reservoir for tape, film, or the like which eliminates "flutter" and other inaccuracies in recording and transmission caused by mechanical impediments to the tape motion.

A still further object is to provide a tape magazine which is light in weight, extremely small, and yet is relatively inexpensive to manufacture and assemble.

Figure 2:
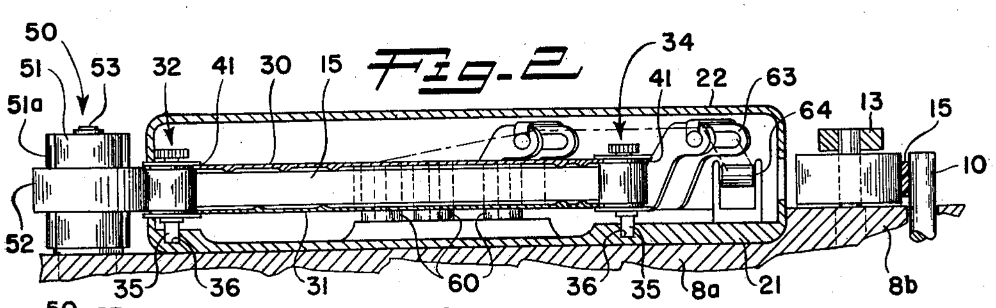
Figure 3:
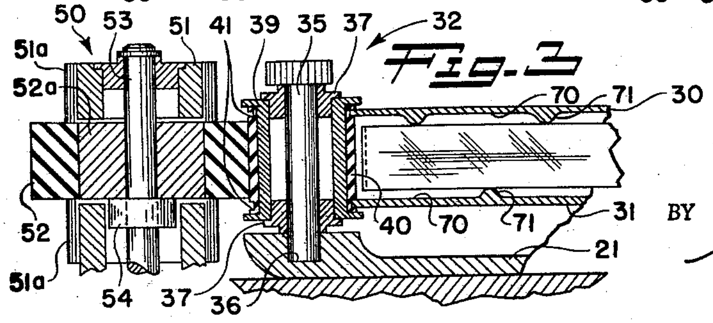
Figure 4:
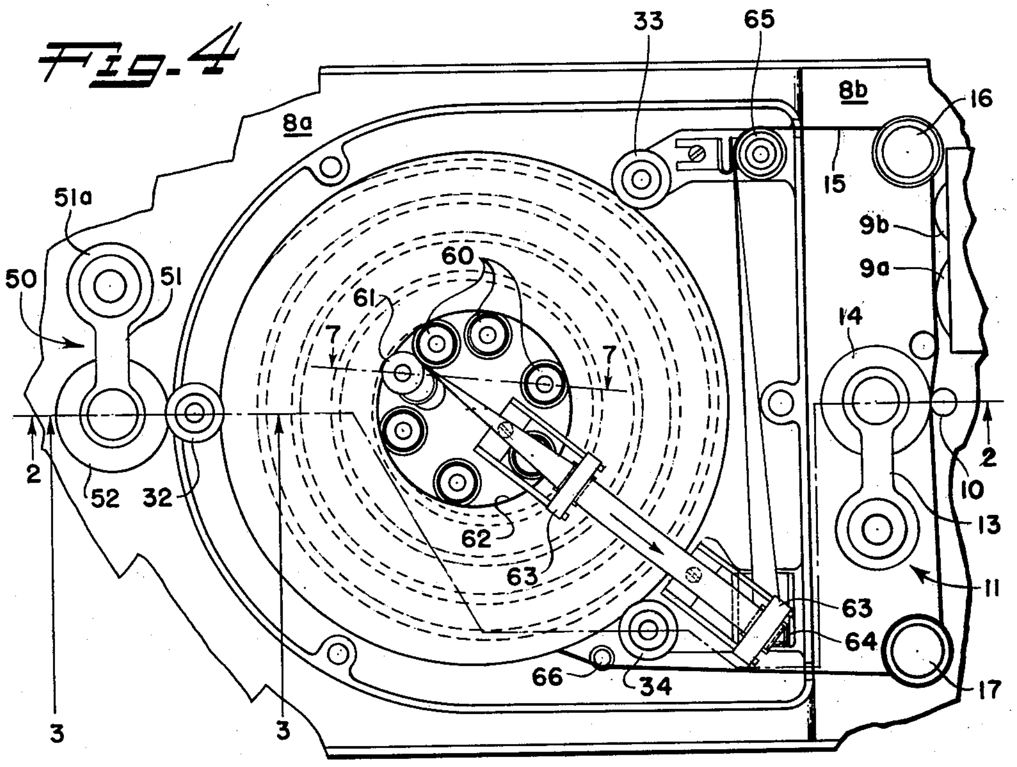
Figure 5:
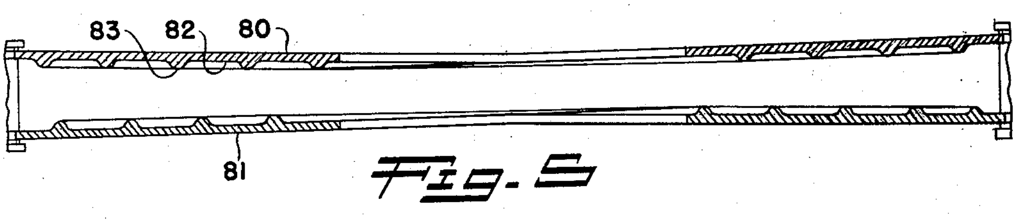
Figure 6:
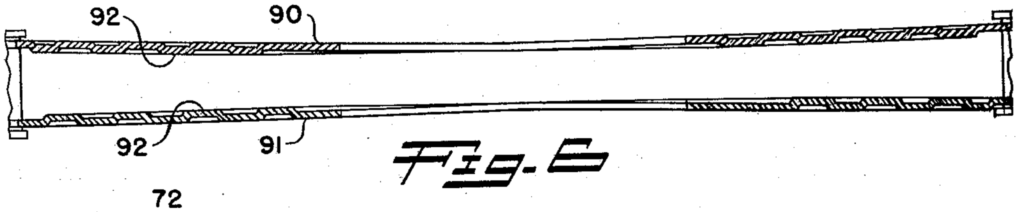
Figure 7:
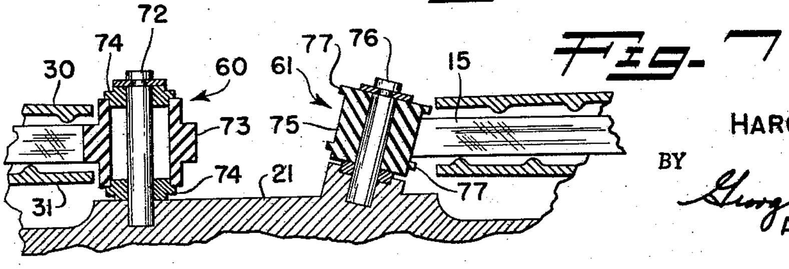

With these and other objects in mind the invention will now be more specifically described in connection with the accompanying drawings wherein like numbers denote like parts throughout and in which FIGURE 1 is a pictorial view showing the tape magazine in place in a recorder assembly with the covers removed, FIGURE 2 is a side-elevational view, shown partly in section (taken on line 2—2 in FIGURE 4), showing the tape-supporting plates and the supporting and drive rollers associated therewith, FIGURE 3 is an enlarged view in greater detail of the plate suspension assembly taken substantially on line 3—3 of FIGURE 4, FIGURE 4 is a top view of the plates and supporting rollers shown pictorially in FIGURE 1, FIGURE 5 is a side-elevational view of a modification of the invention including sloping tape-supporting plates, FIGURE 6 is a further modification of the tape-supporting plates, and FIGURE 7 is a sectional view taken on line 7—7 of FIGURE 4.

Returning to a consideration of FIGURE 1, it will be seen that there is generally shown a tape recorder base 1 having associated therewith an endless loop tape magazine generally indicated at 20 which incorporates the major features of the present invention.

Base structure 1 is composed of a lower unit 2 which is adapted to receive a cover member 3. Located within the lower unit 2 is the drive mechanism assembly partially shown by the cutaway portion in FIGURE 1 and which will be seen to consist of electric motors 4 and 5 interconnected by a worm 6 which cooperates with a worm gear 7 to drive the tape mechanism in a manner which will be described in greater detail hereinbelow.

Insertably positioned within the rim of lower unit 2 is a support member 8 which may be mounted by any desirable means upon a shoulder or the like integral with lower unit 2.

This support member 8 is divided into two portions *8a* and *8b* constituting the endless loop tape magazine support area and a control support area, respectively. Control support area *8b* forms a stage upon which are mounted record/play head *9a* and erase head *9b*.

Provision is made for driving the tape itself past the heads *9a* and *9b* by way of a drive capstan 10 of stainless steel or other non-magnetic material and pressure roller assembly 11 consisting of a pivoted base 12 having an arm 13 at the end of which is rotatably mounted a neoprene or other elastomeric pressure wheel 14.

Tape 15 is withdrawn from the endless loop tape magazine 20 and passes over guide roller 16, past heads *9a* and *9b* and between drive capstan 10 and pressure roller 14, around guide roller 17 and thence back into the tape magazine assembly 20.

Drive capstan 10 is driven at a speed which is synchronized with the driving speed of the tape magazine reel assembly (described hereinbelow) by a suitable linkage system of belts, rollers, and gears beneath support member 8 which are not shown and do not constitute a part of the present invention. In operation, the elastomeric pressure wheel 14 is pivoted into contact with tape 15 forcing it into pressure engagement with drive roller 10 which thereby turns wheel 14 and tape 15 to provide for the transport of the tape. This general method is more or less common practice in the industry.

Reference is taken at this point to FIGURE 4 wherein the particular interrelation and arrangement of the guide roller and tape driving mechanism is provided.

Referring now to the endless loop magnetic tape magazine assembly generally designated at 20, it will be seen that this assembly is located upon area *8a* of support member 8.

Assembly 20 consists of a lower housing 21 and an upper cover 22, both of which are rounded at one end and which converge together to form a complete housing for the tape-supporting elements therewithin.

Referring now to both FIGURES 1 and 2, the tape-driving and supporting mechanism will be described in detail. In FIGURE 2, it will be seen that the coil or spiral of tape 15 is supported between tape supporting plates 30, 31 formed preferably of plastic or lightweight metal. These tape-supporting plates 30, 31 are individually suspended at three separate points by means of plate support roller assemblies 32, 33, and 34.

These tape support roller assemblies 32, 33, and 34 are rotatably mounted on lower housing 21 by pin members 35 extending axially therethrough and socketed in suitable openings 36 in lower housing member 21.

From a consideration of FIGURE 3 it will be seen that pin 35, of metal or plastic material, is coaxially related through a pair of cap members 37 of plastic or metal which are inserted within roller support 39, preferably formed of aluminum, and having thereon a coat of elastomeric or resilient material 40. This coating 40 and/or the roller support 39 have circumferential grooves 41 formed therein at both ends of the assembly of suitable dimensions to receive the circumferential edges of tape-support plates 30, 31.

It is noted that FIGURE 3 shows plate support roller assembly 32. Plate support roller assemblies 33, 34 may be formed identically therewith although I have found the optimum arrangement to require a substitution of the elastomeric material or coating 40 with nylon or other plastic which in any case has circumferential grooves 41 formed in both ends of these rollers to aid in supporting the tape-support plates 30, 31.

It will thus be seen that tape-support plates 30, 31 are individually, rotatably supported at three points on their perimeters by the interfitting of the edges thereof into the grooves 41 in each of the plate support roller assemblies 32, 33, and 34.

Plate support roller assemblies 33, 34 are wholly within the housing formed by lower housing unit 21 and the upper cover 22. However, plate-support assembly 32 will be seen, from a consideration of FIGURES 1, 2, and 4, to extend partially without this housing although it is pivotally socketed therewithin. A portion of the peripheral surface of the roller support 39 and elastomeric coating 40 thereon extend without the housing 21, 22 through an aperture appropriately positioned with regard to this roller assembly.

In FIGURES 1, 3, and 4 magazine drive assembly 50 will be seen to comprise a lever member 51 pivotally mounted to support member 8 through its enlarged end portion **51*a*. At the other end of lever 51 is a drive roller 52 of rubber or other elastomeric, resilient material which is rotatably mounted at the end of lever member 51 by any suitable mechanical arrangement. In FIGURE 3 of this invention this arrangement is shown to consist of a pin member 53 extending normally and coaxially through the end of lever 51 and supporting the elastomeric drive roller 52 through a suitable rim or hub portion 54. Drive roller 52 consists of an aluminum or other hub portion 52*a* which supports the elastomeric driving rim or wheel 52**.

Pin member 53 extends beneath plate support 8 and is suitably geared to the drive motors 4 and 5 As was mentioned hereinbefore, drive capstan 10 and drive roller 52 are each rotated in synchronism by means of two resilient belts each of which is driven from a pulley common to a shaft which is connected to the drive motors 4 and 5. This belt driving system is not shown in the drawings and does not constitute a part of this invention.

In the case of pivoted lever arm 51, this member is biased into contact with plate support roller assembly 32 by the inherent resiliency of the belt drive described. Thus, as lever arm 13 impinges tape 15 against drive capstan 10, lever arm 51 is pressing drive roller 52 into contact with the plate support roller assembly 32 which simultaneously causes the tape-support plates 30, 31 to rotate, and the tape suspended therewithin is also rotated and drawn off of the reel of tape formed between the support plates.

It will be obvious that each of tape-support plates 30, 31 have apertures 62 coaxially formed therewithin. Located within these apertures are a series of guide rollers 60 which impinge against the inner peripheries of the apertures 62 and cooperate with tape guides 63 in leading the tape out from the center of the tape-support plates, around guide mandrel 64 and guide roller 65 and into association with heads **9*a* and 9*b* in a manner as hereinbefore explained. Tape returning into the tape magazine 20 after passing around guide roller 17 and through a suitable aperture 18 in the magazine housing members 21 and 22 passes over guide roller 66 and thence into the area between plate supports 30, 31. It should be noted that guide roller 61** is tilted to facilitate the feed-off operation as noted.

Referring to FIGURE 7, these guide rollers 60 are shown to consist of pins 72 socketed in lower housing member 21. A roller 73 is rotatably, coaxially supported upon pin 72 by means of spacer hubs 74. Roller 73 is provided with end portions of decreased diameter to aid in maintaining the tape-support plates in their correct position.

Tilted guide 61 may be either rotatable or stationary and as shown consists of a roller 75 secured to a pin 76 in a manner similar to rollers 60 and is additionally provided with flanges 77 on either end which prevent the tape from slipping off of the guide member.

A feature of the invention resides in the specific configuration of the tape-supporting plates 30, 31 in that each such plate is provided with a generally spirally shaped groove or series of grooves 70 formed therein by the provision of a spiral indentation or embossment 71. These spiral indentations 71 may either increase or decrease in the "tightness" or degree of spiral as they approach the outer peripheries of tape-support plates 30, 31. In operation the tape, film, or other strip material supported between the plates 30, 31 is forced inwardly toward the center of the tape-support plates by an agitation action set up by the spiral grooves and the rotation of the tape-support plates. In addition, the series of grooves and indentations in the inner surfaces of both plates support the tape placed therewithin in a flexible manner and provide the continuous and smooth transferral of tape from the outer to the inner portions of the tape magazine without the binding and scuffing often encountered in conventional devices as a result of the difference in peripheral speed of the tape as it is fed onto and off of such a tape-support magazine. The tape then in my invention is relatively loosely supported between the tape-support plates and may have a cushion of air between each of the spiral turns of the tape which additionally serves to prevent binding and scuffing which often results in inaccuracies in both the recording and playback cycles.

It should be noted that the tape tends to stay near the outer periphery of the tape-support plates due in part to the centrifugal force involved and, by the operation of the spiral indentations and grooves as the plates rotate, the tape is gently agitated inwardly toward the center of the tape-support plates and the guide rollers 60. By the use of this specific arrangement, I have been able to use standard tapes and films, thus obviating the necessity of using specially lubricated tapes or other special techniques in handling such endless loop strips. I have found that the number of spirals to the inch can be greatly varied with a preferable range of between two and one half (2½) and five (5) being desirable and four (4) spirals to the inch being an optimum configuration. The inner rollers 60 and 61 support the first coil of tape leading from the magazine in an almost circular configuration which results in better feedoff ability as well as the prevention of malfunctions due to the edges of the tape being crushed as normally happens when tape is free to move vertically between reels and guide rollers which are not tightly associated with each other.

Referring now to FIGURE 5, it will be seen that a modification of the invention is shown in which a top tape-support plate 80 has spiral grooves 82 therein formed by the spiral indentation or embossment 83. Likewise, bottom tape-support plate 81 has similar indentations and grooves formed on its inner surface. Each of these plates has an aperture coaxially located in the central portion thereof adapted to receive guide rollers 60 for operation in a manner substantially as described in connection with tape-support plates 30, 31.

An additional distinguishing feature of the modification shown in FIGURE 5 is the fact that the tape-support plates 80, 81 in cross section are seen to converge toward the center and diverge toward the outer periphery thereof. This arrangement has been found to be highly desirable especially for use in connection with longer lengths of tape because of the increased room for vertical agitation of the tape as it feeds from the outer to the inner peripheries of the plates. In this regard it should be noted that with either the flat or sloped plates, there seems to be no practical limit to the diameter of the plates and the footage of endless tape which may be stored therewithin. I have experimented with from seventy-five (75) to as much as seven hundred fifty (750) foot lengths of tape and found that they were equally well handled.

I have similarly found that the endless loop tape magazine of the present invention works equally well at high as well as low speeds. Specifically, experiments have been conducted at speeds from 0.8 to more than fifteen (15) inches per second, and it is believed there is no practical limitation on the speed which could be used, dependent upon the fidelity of reproduction required.

As was mentioned hereinabove, the tape-support plates work very satisfactorily when positioned parallel to each other. When the diverging plate arrangement is used, it has been found that a divergence or angle of from one degree twenty minutes to one degree thirty minutes is optimum while a divergence of even five degrees produced satisfactory results.

A consideration of FIGURE 6 will show an additional modification of the invention in which the tape-supporting plates 90, 91 diverge toward their periphery in a manner similar to that indicated with the plates 80, 81 of FIGURE 5. However, plates 90, 91 have a different shaped spiral embossment 92 therein which in cross section is shown to be substantially flat at its inner most surface and having slightly rounded edges in contradistinction to the substantially circular or elliptical embossment 83 described in connection with the modification of FIGURE 5. These embossments should not extend inwardly to such an extent that they interfere with the ready transferral of tape from the outer to the inner sections of the magazine.

The tape-support plates are preferably formed by pressing in a stamping die from a flat configuration and may be formed of plastic or other light weight material. Additionally, they may be formed by casting them in a mold having the preferred spiral embossment arrangement.

Although the tape-support plates and the tape itself is simultaneously and sychronously rotated upon actuation of the drive motors 4 and 5, the general looseness of the tape as it is contained between the tape-support plates assures an extremely low inertial resistance to the passage of tape past heads 9*a* and 9*b*. Thus, upon being given an actuating signal, it will be obvious that only a very low current is required to cause tape 15 to move between drive capstan 10 and pressure roller 14. With this arrangement, it is possible to start and stop the tape from a speed of more than fifteen (15) inches per second in less than one tenth (1/10) of an inch.

As has been mentioned previously, the possibility of the recorder being placed in a "tumbling" environment, as in a satellite for instance, would actually aid in the agitation of the tape between the tape-support plates and would facilitate rather than hinder a smooth transferral from the outer toward the inner sections of the plates.

It has additionally been found that a tape recorder utilizing the tape storage magazine of the present invention can be operated in a low temperature environment with temperatures down to sixty (60) degrees centigrade below zero. Similarly, it has the added ability to withstand extreme heat, the limits of which are established by the recording medium itself.

*Operation*

A cycle of operation will now be described in connection with a tape magazine of the instant invention. Referring to FIGURE 1, upon input of a proper signal actuating motors 4 and 5, the magazine drive assembly 50, resiliently biased into contact with plate support roller 32, simultaneously is rotated in synchronization with drive capstan 10. Tape-support plates 30, 31, individually supported in grooves 41 in plate support rollers 32, 33, and 34, are rotated, thus tending to move by means of the spiral embossments the tape 15 from the outer to the inner periphery of the tape-support plates at which point the inner coil thereof is continuously fed off of rollers 60 and 61 through tape guides 63 over mandrel 64 and around roller 65 and 16 into association with the record-playback and erase heads 9*a*, 9*b*. Thence the tape proceeds between roller 14 and drive capstan 10, around roller 17 and mandrel 66 and is fed into the space between the outer peripheries of the tape-support plates 30, 31.

Obviously, endless loop tape magazine 20 may be easily installed and withdrawn from the recorder drive mechanism generally designated at 1. Additionally, a light weight, highly reliable, low current drain endless loop tape mechanism has been provided which is dependably operable in a wide variety of physical environments while at the same time presenting a rugged vibration impervious mechanism.

While certain preferred embodiments of this invention have been specifically disclosed, it is understood that the invention is not limited thereto, as many variations will be readily apparent to those skilled in the art, and the invention is to be given the broadest interpretation within the terms of the following claims.

What is claimed is:

1. A magazine for storing an endless strip of tape comprising a base member, at least one pair of spaced, circular, tape-supporting plates, at least three plate-supporting rollers having their axes in substantially vertically disposed relation to said base member angularly positioned about said plates, said rollers being rotatably journaled in said base member, the outer peripheral surfaces of each of said rollers impinging against the circumferential edges of said plates, means on the inner surface of at least one of said plates adapted to gently dispose tape from the outer toward the inner portion of said plates.

2. A tape storage magazine as claimed in claim 1 in which said means comprises a substantially spiral embossment.

3. A tape magazine for storing and feeding endless loops of tape comprising a substantially rectangular base member having vertical walls and a rounded end, a pair of apertures in the unrounded end wall for receiving and discharging tape, and an aperture in the rounded end wall; a pair of spaced, coaxial, circular, tape-supporting plates; three plate-supporting rollers having their axes substantially normally disposed to said base member and connected thereto, said rollers having circumferential grooves in each end thereof receiving and supporting the peripheral edges of said tape-supporting plates, at least a portion of one roller having its surface coated with an elastomeric material which extends through the aperture in said rounded end wall, and means on the inner facing surface of at least one of said tape-supporting plates for gently forcing tape placed therebetween from the outer toward the inner portions of said plates.

4. An endless loop tape magazine as claimed in claim 3 in which said means comprise a substantially spiral embossment.

5. A tape storage magazine as claimed in claim 4 in which said embossment is substantially semicircular in cross section.

6. A tape storage magazine as claimed in claim 4 in which said embossment is substantially rectangular in cross section.

7. An endless loop tape magazine as claimed in claim 3 in which said tape-supporting plates uniformly diverge from the central to their outer peripheral portions.

8. An endless loop tape storage magazine comprising a base member, at least one pair of spaced tape-supporting plates individually, rotatably mounted thereon, at least one of said tape-supporting plates having a spiral embossment on the inner facing surface thereof, said spiral embossment containing from approximately two to approximately five convolutions per radial inch.

9. An endless loop tape storage magazine comprising a base member, at least one pair of spaced tape-supporting plates individually, rotatably mounted thereon, at least one of each pair of said tape-supporting plates having a spiral embossment on the inner surface thereof, the distance between the top of the spiral embossment on each said tape-supporting plate and the closest adjacent points of the other tape-supporting plate being at least substantially equal to the width of a given tape placed therebetween.

10. An endless loop tape storage magazine comprising a base member, at least one pair of spaced, circular, tape-supporting plates, means for individually rotatably connecting said plate to said base member, the inner surface of at least one of said plates having at least one substantially spiral groove therein, and means mounted on said base member for guiding said tape as it is simultaneously fed to and withdrawn from the outer and inner peripheral areas, respectively, of said plates.

11. A tape storage magazine as claimed in claim 10 in which the means for rotatably connecting said plates with said base member comprise a plurality of plate-supporting rollers angularly disposed about the outer periphery of said plate members.

12. An endless loop tape storage magazine comprising a base member, at least one pair of coaxial, spaced, tape-supporting plates, means for rotatably mounting said tape-supporting plates upon said base member, means on the inner surface of at least one of said tape-supporting plates for gently disposing tape placed therebetween from the outer toward the inner portion of said tape-supporting plates, and means mounted on said base member for guiding said tape as it is simultaneously fed to and withdrawn from the outer and inner peripheral areas, respectively, between said tape-supporting plates.

13. An endless loop tape storage magazine as claimed in claim 12 in which said tape-supporting plates diverge from their inner to their outer peripheries.

14. An endless loop tape storage magazine as claimed in claim 13 in which said plates are individually supported on said base member and uniformly converge from their outer toward their inner peripheries, and in which the means for disposing said tape toward the inner periphery comprises a substantially spiral embossment formed in the inner surface of at least one of said plates.

15. An endless loop tape storage magazine as claimed in claim 14 in which both of the tape-supporting plates in each pair thereof have substantially spiral embossments in their inner surfaces and in which said embossments are generally semi-circular in cross-sectional configuration.

References Cited in the file of this patent

UNITED STATES PATENTS

| | | |
|---|---|---|
| 1,426,614 | Sutherland | Aug. 22, 1922 |
| 2,091,525 | Runge | Aug. 31, 1937 |
| 2,334,952 | Perbal | Nov. 23, 1943 |
| 2,499,348 | Alberts et al. | Mar. 7, 1950 |
| 2,639,915 | Randazzo | May 26, 1953 |
| 2,921,787 | Cousino | Jan. 19, 1960 |

OTHER REFERENCES

German application, 1,031,633, printed June 4, 1958 (Kl. 47a, 49).